US008573112B2

(12) United States Patent
Nakayama et al.

(10) Patent No.: US 8,573,112 B2

(45) Date of Patent: Nov. 5, 2013

(54) HIGH-PRESSURE FUEL PUMP AND SEAL SYSTEM FOR HIGH-PRESSURE FUEL PUMP

(75) Inventors: Junichi Nakayama, Fujisawa (JP); Nobuyuki Eguchi, Nihonmatsu (JP); Tamio Inamura, Fujisawa (JP); Kokichi Hamamoto, Fukushima (JP); Hiroshi Inoue, Kariya (JP)

(73) Assignees: NOK Corporation (JP); Denso Corporation (JP)

( * ) Notice: Subject to any disclaimer, the term of this patent is extended or adjusted under 35 U.S.C. 154(b) by 952 days.

(21) Appl. No.: 12/087,848

(22) PCT Filed: Dec. 14, 2006

(86) PCT No.: PCT/JP2006/324898

§ 371 (c)(1), (2), (4) Date: Jul. 16, 2008

(87) PCT Pub. No.: WO2007/080739

PCT Pub. Date: Jul. 19, 2007

(65) Prior Publication Data

US 2009/0008883 A1 Jan. 8, 2009

(30) Foreign Application Priority Data

Jan. 16, 2006 (JP) ................................ 2006-006928

(51) Int. Cl.
*F16J 15/20* (2006.01)

(52) U.S. Cl.
USPC .............................. 92/168; 277/587; 277/589

(58) Field of Classification Search
USPC ............................ 92/168; 277/518, 587, 589
See application file for complete search history.

(56) References Cited

U.S. PATENT DOCUMENTS

| | | | | |
|---|---|---|---|---|
| 3,323,806 | A * | 6/1967 | Smith et al. | 277/589 |
| 5,098,071 | A * | 3/1992 | Umetsu | 277/589 |
| 6,789,459 | B2 * | 9/2004 | Sano et al. | 92/168 |
| 6,938,901 | B2 | 9/2005 | Tsuchiya et al. | |
| 2004/0164496 | A1 * | 8/2004 | Okada et al. | 277/549 |

FOREIGN PATENT DOCUMENTS

| | | | |
|---|---|---|---|
| DE | 60121044 | T2 | 12/2006 |
| EP | 1 357 284 | A1 | 10/2003 |
| JP | 08-068370 | | 3/1996 |
| JP | 2005-23791 | A | 1/2005 |
| WO | WO-02/052148 | A1 | 7/2002 |

* cited by examiner

*Primary Examiner* — F. Daniel Lopez

(74) *Attorney, Agent, or Firm* — Harness, Dickey & Pierce, P.L.C.

(57) ABSTRACT

To cope with severe use conditions, a high-pressure fuel pump has a seal system (21) for separating/sealing fuel and lubricating oil, in an annular space between an axle reciprocating within the pump and a housing having the axle passing therethrough, wherein the seal system (21) consists of a combination of a fuel-side seal (31) for sealing fuel and lubricating-oil-side seal (41) for sealing lubricating oil, the fuel-side seal (31) is composed of a plastic-made seal ring (32) and a rubbery-elastomer-made O ring (33) for backup of the seal ring (32), the lubricating-oil-side seal (41) consists of a single body of single-lip-type oil seal (42) having a rubbery-elastomer-made seal lip (44) fitted to a metal ring (43) and arranged toward the lubricating oil side, and a distance between the fuel-side seal (31) and the lubricating-oil-side seal (41) is set to be larger than the reciprocating distance of the axle.

6 Claims, 11 Drawing Sheets

HIGH-PRESSURE FUEL PUMP AND SEAL SYSTEM FOR HIGH-PRESSURE FUEL PUMP

CROSS-REFERENCE TO RELATED APPLICATIONS

This is a national stage of the International Application No. PCT/JP2006/324898 filed on Dec. 14, 2006 and published in Japanese language.

BACKGROUND OF THE INVENTION

1. Field of the Invention

The present invention relates to a high pressure fuel pump and a seal system using therefor.

2. Description of the Conventional Art

As illustrated in FIG. 11, a conventional high-pressure fuel pump has a rubber type oil seal 52 slidably arranged on the outer peripheral side of a plunger (axle) 51, and this oil seal 52 separates and seals two liquids of gasoline (fuel) G and engine oil (lubricating oil) O. Further, this high-pressure fuel pump has a return pipe 54 at a cylinder (housing) 53, in order is to return the gasoline G, which is slightly leaked from a portion between the plunger 51 and the cylinder 53 as a bearing of the plunger 51, to a fuel tank (refer to Unexamined Japanese Patent Publication No. 8-68370 (FIG. 2)).

In the above-described high-pressure fuel pump, earnest works has been carried out to omit a gasoline recovering circuit by the return pipe 54 in order to simplify a structure. However, when the gasoline recovering circuit is omitted, the gasoline G leaked from a portion between the plunger 51 and the cylinder 53 is retained as it is so that the pressure may become equal to discharge pressure (about 10 MPa). Under such high pressure, the oil seal 52 may be damaged at an early stage. In order to prevent this problem, a pipe for connecting from a fuel pump to a suction port of the high-pressure fuel pump is distributed to a return port so as to make the pressure applied to the oil seal 52 to be a lowest pressure of the fuel pump (about 0.5 MPa). However, even this pressure still affect to the oil seal 52 not small. Further, the plunger 51 reciprocates at a remarkably high speed according to the work of an engine.

However, a single product of an oil seal that is usable under severe conditions of “high speed”, “high pressure” and “fuel resistance” has not developed yet, and thus it is required to develop a new seal system that is usable under such the severe conditions.

SUMMARY OF THE INVENTION

Problems to be solved by the Invention

The present invention solves the above-described problems, and an objective of the present invention is to provide a high-pressure fuel pump with a seal system that is usable under the conditions of “high speed”, “high pressure” and “fuel resistance”, and a seal system using the pump.

Means to Solve the Problems

According to a first aspect of the present invention, in order to realize the above-described objective, a high-pressure fuel pump has a seal system for separating/sealing of fuel and lubricating oil as sealing objects, in an annular space between an axle reciprocating within the pump and a housing having the axle passing therethrough, wherein the seal system consists of a combination of a groove-shaped seal mounting part provided on an inner periphery of the housing at the fuel side, a fuel-side mounted in the seal mounting part at the fuel side for sealing of fuel, a groove-shaped seal mounting part provided on an inner periphery of the housing at the lubricating oil side, and a lubricating-oil-side seal mounted in the seal mounting part at the lubricating oil side for sealing of lubricating oil, the fuel-side seal is composed of a plastic-made seal ring and a rubbery-elastomer-made O ring for backup of the seal ring, the lubricating-oil-side seal consists of a single body of a single-lip-type oil seal having a rubbery-elastomer-made seal lip fitted to a metal ring and arranged toward the lubricating oil side, and a distance between the fuel-side seal and the lubricating-oil-side seal is set to be larger than a reciprocating motion distance of the axle.

According to a second aspect of the present invention, the high-pressure fuel pump of the first aspect is structured such that the rubbery-elastomer-made O ring tightly contacts to an inner surface of a tapered housing having a diameter gradually reducing from the lubricating oil side toward the fuel side.

According to a third aspect of the present invention, the high-pressure fuel pump of the first aspect is structured such that a washer is provided at the fuel side than the fuel-side seal.

According to a fourth aspect of the present invention, a seal system for separating/sealing of fuel and lubricating oil as sealing objects is provided in an annular space between an axle reciprocating within a high-pressure fuel pump and a housing having the axle passing therethrough, wherein the seal system consists of a combination of a groove-shaped seal mounting part provided on an inner periphery of the housing at the fuel side, a fuel-side seal mounted in the seal mounting part at the fuel side for sealing of fuel, a groove-shaped seal mounting part provided on an inner periphery of the housing at the lubricating oil side, and a lubricating-oil-side seal mounted in the seal mounting part at the lubricating oil side for sealing of lubricating oil, the fuel-side seal is composed of a plastic-made seal ring and a rubbery-elastomer-made O ring for backup of the seal ring, the lubricating-oil-side seal consists of a single body of a single-lip-type oil seal having a rubbery-elastomer-made seal lip fitted to a metal ring and arranged toward the lubricating oil side, and a distance between the fuel-side seal and the lubricating-oil-side seal is set to be larger than a reciprocating motion distance of the axle.

Further, according to a fifth aspect of the present invention, the seal system of the fourth aspect is structured such that the rubbery-elastomer-made O ring tightly contacts to an inner surface of a tapered housing having a diameter gradually reducing from the lubricating oil side toward the fuel side.

Furthermore, according to a sixth aspect of the present invention, the seal system of the fourth aspect is structured such that a washer is provided at the fuel side than the fuel-side seal.

When a plastic-made seal ring is compared with a rubbery type oil seal according the above-described conventional art, the plastic-made seal ring generally has wear resistance to meet the conditions of “high speed” and “high pressure”, and oil resistance to meet the condition of “fuel resistance”. Thus, the plastic-made seal ring is mounted in the seal mounting part at the fuel side as the fuel-side seal for sealing of fuel in the present invention. Further, in order to obtain axle followability of the plastic-made seal ring, a rubbery-elastomer-made O ring is used together as a backup ring. Further, an oil seal is mounted in the seal mounting part at the lubricating oil side as the lubricating-oil-side seal for sealing of lubricating oil. As for the oil seal, when considering the axle reciprocating at high speed, it is preferable to use an oil seal with a metal ring by which a contacting state between a seal lip and an axle can be stabilized most. Further, as for the oil seal, the seal lip is arranged in such a direction as to seal the lubricating oil. When the seal lip is arranged in such the direction as to seal the lubricating oil, fuel slightly dripped from an oil film (a fuel oil film) formed by the plastic-made seal ring is scraped out by the oil seal. Thereby, generation of a pressure accumulating phenomenon between the fuel-side seal and the lubricating-oil-side seal can be prevented. Furthermore, fuel leaked from the seal lip is in a trace amount, so that there is no problem in a pump device.

Further, in order to suppress a leaking amount of the fuel-side seal to be the minimum, it is effective that an axial distance between the fuel-side seal and the lubricating-oil-side seal is set to be larger than the reciprocating motion distance of the axle. When considering a dimensional tolerance of each part, it is desirable that the distance between both the seals is set to be larger by 0.5 mm or more than the reciprocating motion distance of the axle. Further, when the distance between both the seals is set to be larger than the reciprocating motion distance of the axle, the lubricating-oil-side seal does not reach the oil film formed by the fuel-side seal (except the above described dripped part) at the time of an operation of the axle. Thus, it can be prevented that the lubricating-oil-side seal scratches out the oil film (fuel) toward the lubricating oil side.

Further, the fuel-side seal which is composed of the plastic-made seal ring and the rubbery-elastomer-made O ring generally has a symmetrical shape in the axial direction. However, when the fuel-side seal has such the symmetry shape in the axial direction, the thickness of the oil film formed by the moving direction of the axle is equal at the times of forward movement and return movement of the axle. Thus, the sealing ability may be less than that of a lip-type seal having seal directionality. Therefore, in order to prevent such the problem, the inner surface of the housing which keeps the O ring is formed in a tapered shape having a diameter gradually reduced from the lubricating oil side toward the fuel side, and thereby a peak of surface pressure distribution of the seal ring with respect to the axle is shifted toward the fuel side. When the peak of surface pressure distribution of the seal ring is shifted toward the fuel side, the thickness of the oil film, which is formed at the time of movement of the axle from the fuel side toward the lubricating oil side, can be thinned. Conventionally, there are many examples in which a plastic-made seal lip has a lip-type shape. However, the cost for processing such the seal lip is high, and a contacting state becomes unstable since the seal lip contacts to an axle through an O ring.

Furthermore, when it is necessary to control the plastic-made seal ring and the rubbery-elastomer-made O ring not to slip out from the housing, a washer can be incorporated at the fuel side than the fuel-side seal. Further, when the washer is arranged, pulse absorbing effect of the fuel pressure, which is made by a space portion between a washer inner diameter and a plunger outer diameter, can be expected.

Effectiveness of the Invention

The present invention has the following effects.

In the high-pressure fuel pump according to the first aspect of the present invention, fuel is sealed by mounting the plastic-made seal ring, which has excellent wear resistance and oil resistance, in the seal mounting part at the fuel side, and lubricating oil is sealed by mounting the oil seal with a metal ring, by which a contacting state between a seal lip and an axle can be stabilized most, in the seal mounting part at the lubricating oil side. Therefore, by realizing a seal constitution with right materials being used for right places, a high-pressure fuel pump having a seal system that is usable under the severe conditions of “high speed”, “high pressure” and “fuel resistance” can be provided.

Further, the oil seal is a single-lip-type oil seal, in which the seal lip is arranged toward the lubricating oil side. Thus, slight amounts of fuel leaked from the plastic-made seal ring can be discharged toward the lubricating oil side through the seal lip. Therefore, generation of pressure accumulation between the fuel-side seal and the lubricating-oil-side seal can be prevented, and application of excessive load to the seals can be prevented. In this case, since the amount of fuel leaked from the oil seal is in a trace amount, there is no problem in a device even if the fuel is mixed into the lubricating oil.

Further, the distance between the fuel-side seal and the lubricating-oil-side seal is set to be larger than the reciprocating motion distance of the axle. Thus, it can be prevented that the lubricating-oil-side seal reaches to the oil film (except the dripped part) formed by the fuel-side seal at the time of operation of the axle. Therefore, it can be prevented that the lubricating-oil-side seal scratches out the oil film (fuel) toward the lubricating oil side, and thus the leaking amount of the dripped fuel can be suppressed to the minimum.

Further, in the high-pressure fuel pump according to the second aspect of the present invention, the rubbery-elastomer-made O ring can be made to tightly contact to the inner surface of the tapered housing having a diameter gradually reducing from the lubricating oil side toward the fuel side. Thus, the peak of surface pressure distribution of the plastic-made seal ring with respect to the axle can be shifted toward the fuel side than that in case of a symmetrical shape in the axial direction. Therefore, the thickness of the oil film formed when the axle moves from the fuel side toward the lubricating oil side can be thinned, and thus the leaking amount of the fuel can be reduced also from this point.

Further, in the high-pressure fuel pump according to the third aspect of the present invention, the washer is arranged at the fuel side than the fuel-side seal. Thus, the absorbing effect of the fuel pressure pulse, which is made by the space portion between a washer inner diameter and a plunger outer diameter, can be expected.

Further, in the seal system according to the fourth aspect of the present invention, fuel is sealed by mounting the plastic-made seal ring, which has excellent wear resistance and oil resistance, in the seal mounting part at the fuel side, and lubricating oil is sealed by mounting the oil seal with a metal ring, by which a contacting state between a seal lip and an axle can be stabilized most, in the seal mounting part at the lubricating oil side. Therefore, by realizing a seal constitution with right materials being used for right places, a high-pressure fuel pump with a seal system that is usable under the severe conditions of “high speed”, “high pressure” and “fuel resistance” can be provided.

Further, the oil seal is a single-lip-type oil seal, in which the seal lip is arranged toward the lubricating oil side. Thus, slight amounts of fuel leaked from the plastic-made seal ring can be discharged toward the lubricating oil side through the seal lip. Therefore, generation of pressure accumulation between the fuel-side seal and the lubricating-oil-side seal can be prevented, and application of excessive load to the seals can be prevented. In this case, since the amount of fuel leaked from the oil seal is in a trace amount, there is no problem in a device even if the fuel is mixed into the lubricating oil.

Further, the distance between the fuel-side seal and the lubricating-oil-side seal is set to be larger than the reciprocating motion distance of the axle. Thus, it can be prevented that the lubricating-oil-side seal reaches to the oil film (except the dripped part) formed by the fuel-side seal at the time of operation of the axle. Therefore, it can be prevented that the lubricating-oil-side seal scratches out the oil film (fuel) toward the lubricating oil side, and thus the leaking amount of the dripped fuel can be suppressed to the minimum.

Further, in the seal system according to the fifth aspect of the present invention, the rubbery-elastomer-made O ring can be made to tightly contact to the inner surface of the tapered housing having a diameter gradually reducing from the lubricating oil side toward the fuel side. Thus, the peak of surface pressure distribution of the plastic-made seal ring with respect to the axle can be shifted toward the fuel side than that in case of a symmetrical shape in the axial direction. Therefore, the thickness of the oil film formed when the axle moves from the fuel side toward the lubricating oil side can be thinned, and thus the leaking amount of the fuel can be reduced also from this point.

Furthermore, in the seal system according to the sixth aspect of the present invention, the washer is arranged at the fuel side than the fuel-side seal. Thus, the absorbing effect of the fuel pressure pulse can be expected.

DETAILED DESCRIPTION OF PREFERRED EMBODIMENT

Then, examples of the present invention will be described with reference to the drawings.

First Example

Figure 1:
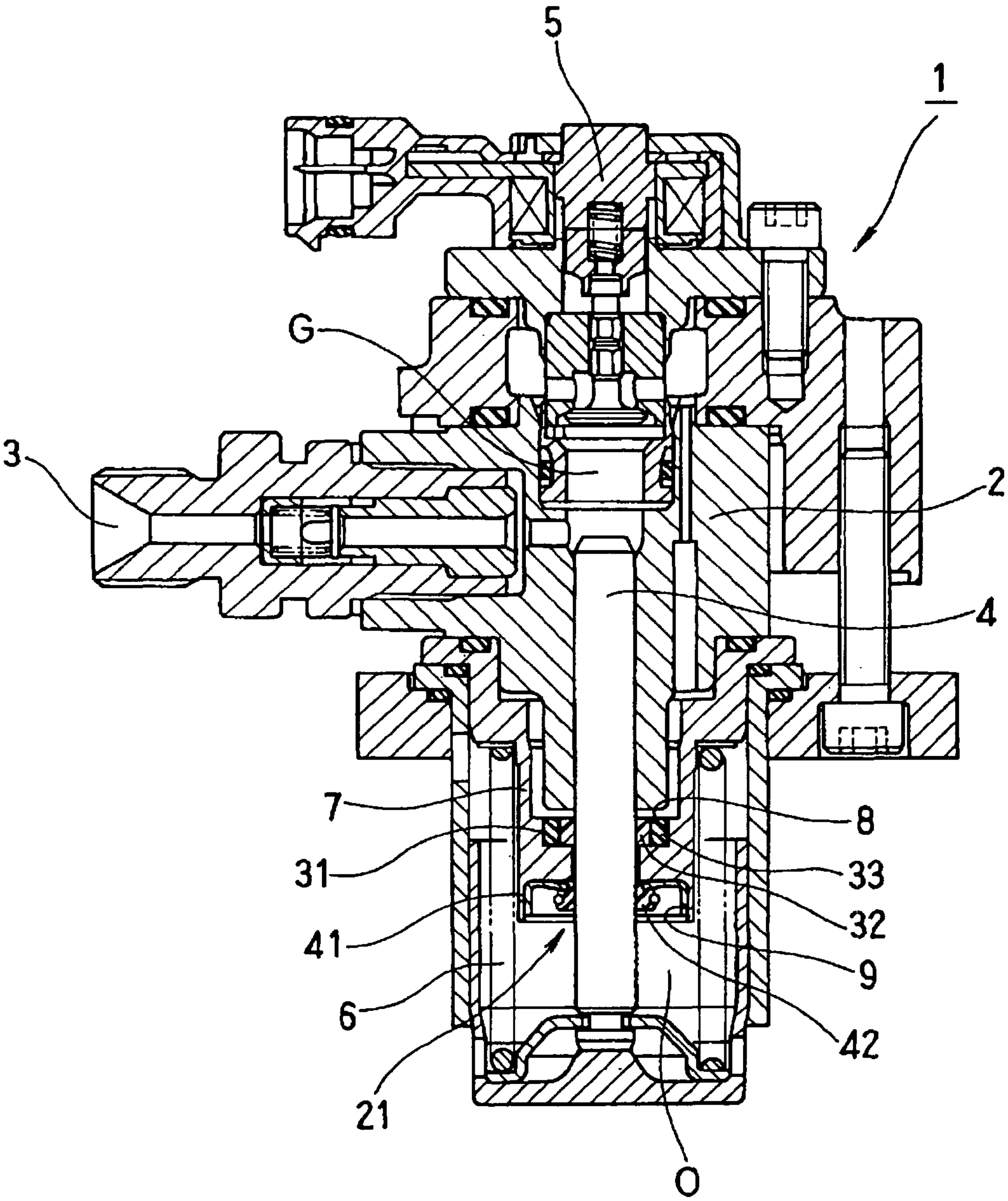
FIG. 1 is a cross sectional view of a high-pressure fuel pump according to a first example of the present invention.

FIG. 1 is a cross sectional view of a high-pressure fuel pump 1 according to an example of the present invention.

The high-pressure fuel pump 1 according to this example includes a cylinder 2 for sucking gasoline as fuel from a suction port which is not illustrated, a plunger (axle) 4 for pressurizing the sucked gasoline and feeding it, an electromagnetic valve 5 for controlling a discharging amount of the pressurized gasoline, and a return spring 6 for returning the plunger 4. Particularly, the high-pressure fuel pump 1 has a feature of including a seal system 21 as a sealing device having the following constitution. The seal system 21 is for separating/sealing of gasoline G as the fuel and engine oil O as lubricating oil and is provided in an annular space between a seal housing (housing) 7 and the plunger 4. The seal housing 7 is also functioned as a spring retainer provided at a lower part of the cylinder 2, and the plunger 4 is inserted to an inner periphery of an axle hole of the seal housing 7 so as to freely reciprocate. The seal system 21 is constituted as follows.

Figure 2:
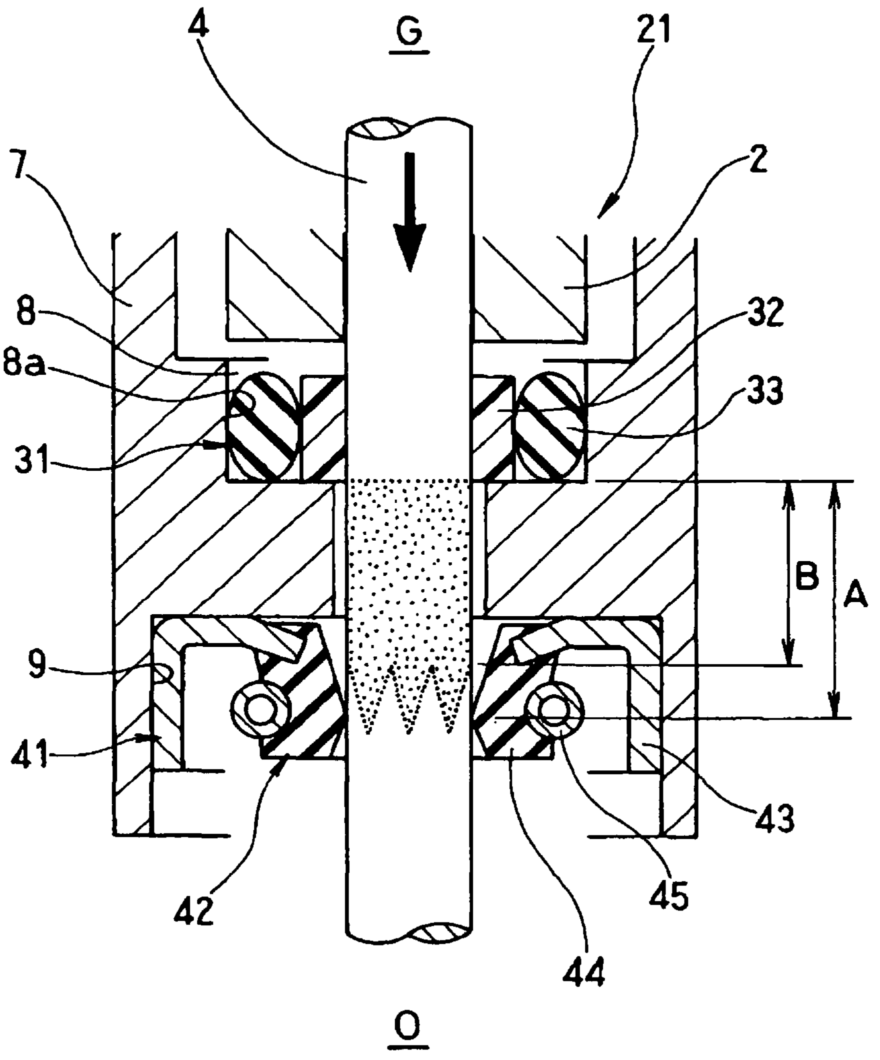
FIG. 2 is a cross sectional view of a seal system (at the time of return movement of a plunger) which the pump has.

As illustrated in FIG. 2 enlargedly, a seal mounting part 8 in a groove shape is provided on an inner periphery of the seal housing 7 and at the gasoline G side, and a fuel-side seal 31 is mounted in the seal mounting part 8. Further, a seal mounting part 9 in a groove shape is provided on an inner periphery of the seal housing 7 and at the engine oil O side, and a lubricating-oil-side seal 41 is mounted in the seal mounting part 9.

The fuel-side seal 31 is composed of a plastic-made seal ring 32 and a rubbery-elastomer-made O ring 33 for backup of the seal ring 32. The seal ring 32 slidably and tightly contacts to a peripheral surface of the plunger 4, and has an O ring 33 fitted at the outer peripheral side thereof.

The seal ring 32 is formed with a predetermined plastic so as to have a cross sectional rectangular shape. As a material of the seal ring 32, PTFE (polytetrafluoroethylene) having excellent fuel resistance and high wear resistance as a sliding material is particularly desirably used when considering use under a high speed and high pressure condition.

Further, the O ring 33 is formed with a predetermined rubbery elastomer so as to have a cross sectional O shape. As a material of the O ring 33, a fluoro elastomer which is a rubbery material having excellent fuel resistance and alcohol resistance is particularly desirably used.

On the other hand, the lubricating-oil-side seal 41 is made of a single body of a single-lip-type oil seal 42 formed by attaching a rubbery-elastomer-made seal lip 44 to a metal ring 43 through vulcanizing of it. The lubricating-oil-side seal 41 is fitted at the inner peripheral side of the seal housing 7 by the metal ring 43, and is slidably and tightly contacted with a peripheral face of the plunger 4 by the seal lip 44. The seal lip 44 is arranged toward the engine oil O side so as to effectively seal the engine oil O. Further, the seal lip 44 is fitted with a garter spring 45 for adjusting an interference. As for the type of the oil seal 42, the oil seal having the metal ring 43 is selected by which a contacting state between the seal lip 44 and the plunger 4 is stabilized most.

Further, the distance between the fuel-side seal 31 and the lubricating-oil-side seal 41 (a distance from an engine oil O side end part of a sliding surface of the seal ring 32 to a lip end of the seal lip 44) A is set to be larger than a reciprocating distance B of the plunger 4 by 0.5 mm or more in an exact size (A>B). The reciprocating distance B of the plunger 4 means a moving distance in accordance with reciprocating motion of the plunger 4, and an oil film is formed on a peripheral surface of the plunger 4 according to this distance.

In the high-pressure fuel pump 1 having the above-described constitution, the seal system 21 is mounted in an annular space between the seal housing 7 and the plunger 4 which reciprocates in the pump as described above for separating/sealing the gasoline G and the engine oil O. The high-pressure fuel pump 1 has the feature that the following operational effects are achieved by having the above-described constitution.

As described above, the gasoline G is sealed by the seal ring 32 made of PTFE having excellent wear resistance and fuel resistance, and the engine oil O is sealed by the oil seal 42 with the metal ring 43 by which the contacting state between the seal lip 44 and the plunger 4 is stabilized most. The seal ring 32 made of PTFE is hardly worn by sliding due to the characteristics of the material even when being used under the conditions of high speed and high pressure, and is hardly eroded with the gasoline G. Further, the oil seal 42 is also hardly worn because of stably contacting to the plunger 4. Therefore, since such the seal constitution with right materials being used for right places is realized, the seal system can be properly used under the severe conditions of "high speed", "high pressure" and "fuel resistance".

Further, the oil seal 42 is the single-lip-type oil seal in which the seal lip 44 is arranged toward the engine oil O side. Thus, the slight amount of the gasoline G leaked from the seal ring 32 can be discharged to the engine oil O side through the seal lip 44. Therefore, generation of pressure accumulating phenomenon between the fuel-side seal 31 and the lubricating-oil-side seal 41 can be prevented, and application of excessive load to the oil seal 42 to generate a problem such as abnormal wear can be prevented. Further, since the amount of the gasoline G leaked from the oil seal 42 is in a trace amount, there occurs no problem even if the gasoline G is mixed into the engine oil O.

Further, the distance A between the fuel-side seal 31 and the lubricating-oil-side seal 41 is set to be larger than the reciprocating distance B of the plunger 4. Thus, at the time of forward movement of the plunger 4 (an arrow shown in FIG. 2), the lubricating-oil-side seal 41 does not reach the oil film (illustrated by a dotted part in the plunger 4 in FIG. 2) formed by the fuel-side seal 31. Therefore, since the lubricating-oil-side seal 41 does not scratch out the oil film (the gasoline G) toward the engine oil O side, the leaking amount of the dripped fuel can be suppressed to the minimum.

Figure 3:
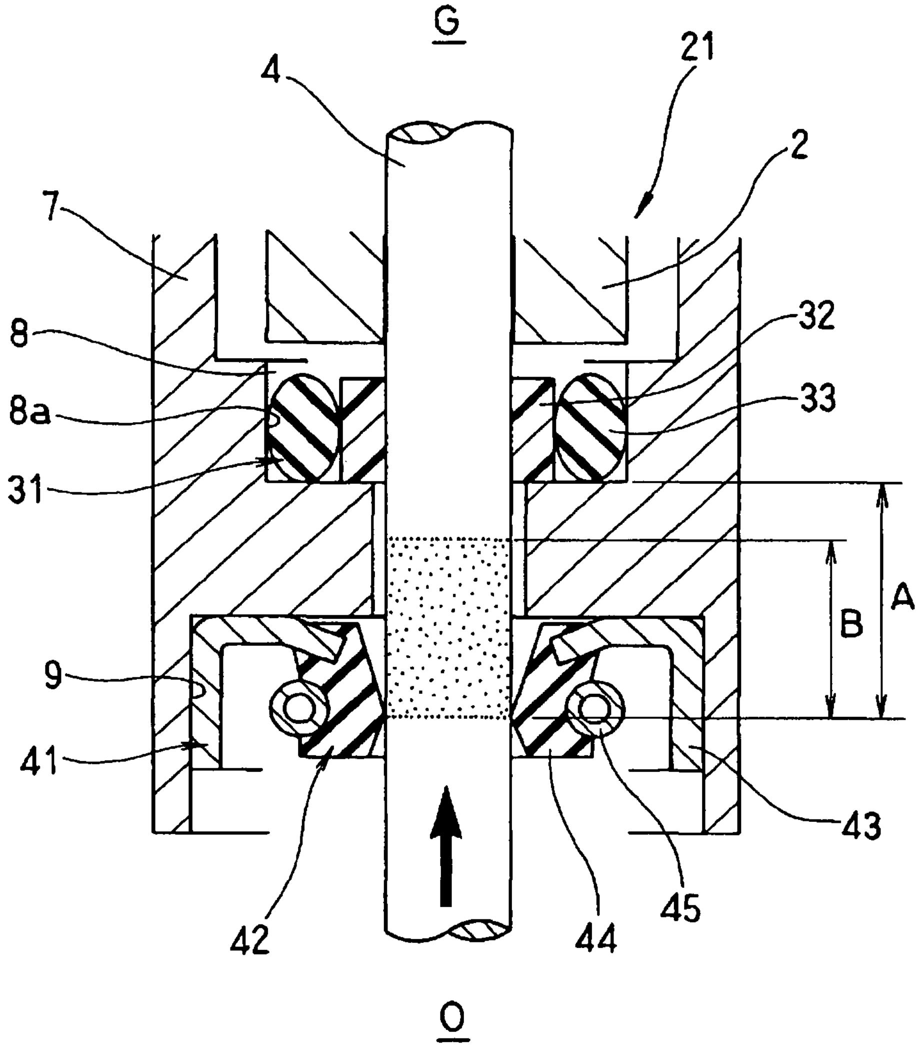
FIG. 3 is a cross sectional view of the seal system (at the time of forward movement of a plunger)

In addition, this state that the seal does not reach the oil film occurs at the opposite side in the axial direction at the time of return movement of the plunger 4 (an arrow shown in FIG. 3) as illustrated in FIG. 3. Thus, intrusion of the oil film (illustrated by a dotted part in the plunger 4 in FIG. 3) formed by the lubricating-oil-side seal 41 into a sliding part of the fuel-side seal 31 can be prevented.

Further, the constitution of the high-pressure fuel pump 1 according to the above-described first example can be added or changed as follows.

Second Example

Figure 4:
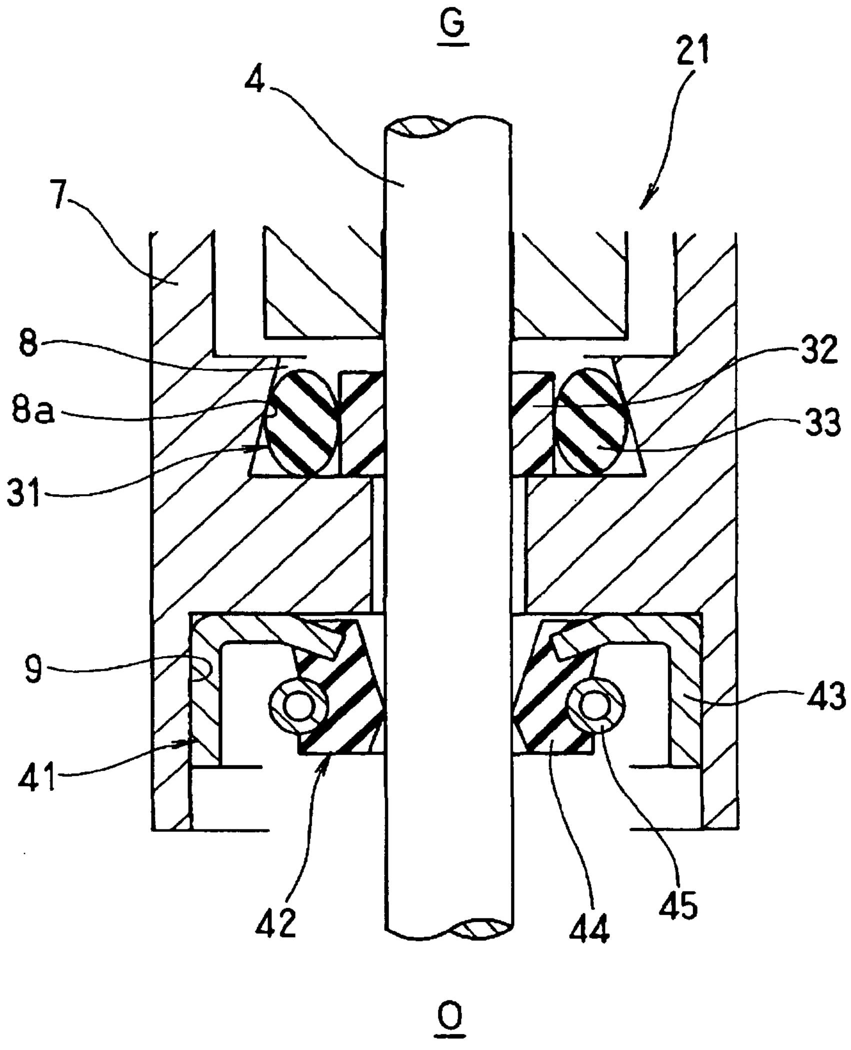
FIG. 4 is a cross sectional view of a seal system according to a second example of the present invention.
Figure 5:
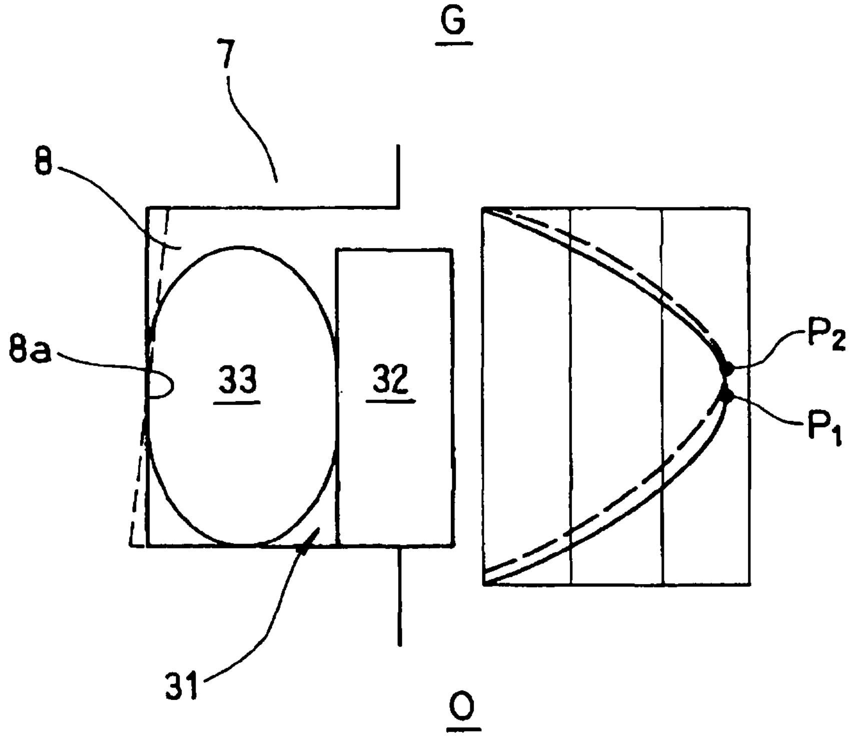
FIG. 5 is an explanatory view to illustrate a state that a peak of surface pressure distribution of a seal ring in the seal system is generated.

In the first example, an inner peripheral surface 8*a* of the seal mounting part 8 holding the O ring 33 of the fuel-side seal 31 is formed in a cylindrical surface shape. However, when the inner peripheral surface 8*a* of the seal mounting part 8 is formed in a tapered surface shape (a conical surface shape) having a diameter gradually reducing from the engine oil O side toward the gasoline G side as illustrated in FIG. 4, a peak of surface pressure distribution of the seal ring 32 with respect to the plunger 4 can be shifted toward the gasoline G side as illustrated in FIG. 5. In FIG. 5, when the inner peripheral surface 8*a* of the seal mounting part 8 has a cylindrical shape, this surface 8*a* is illustrated with a solid line. When the inner peripheral face 8*a* has a tapered shape, this surface is illustrated with a broken line. Further, the peak position in the case of the cylindrical shape is illustrated with $P_1$, and the peak position in the case of the tapered shape is illustrated with $P_2$. Thus, the peak position shifts from $P_1$ to $P_2$ to the gasoline G side. Further, when the peak of surface pressure distribution of the seal ring 32 shifts to the gasoline G side, the thickness of the oil film (the thickness of a gasoline oil film) formed when the plunger 4 moves from the gasoline G side toward the engine oil O side can be thinned. Thus, the leaking amount of gasoline can be reduced.

Third Example

Figure 6:
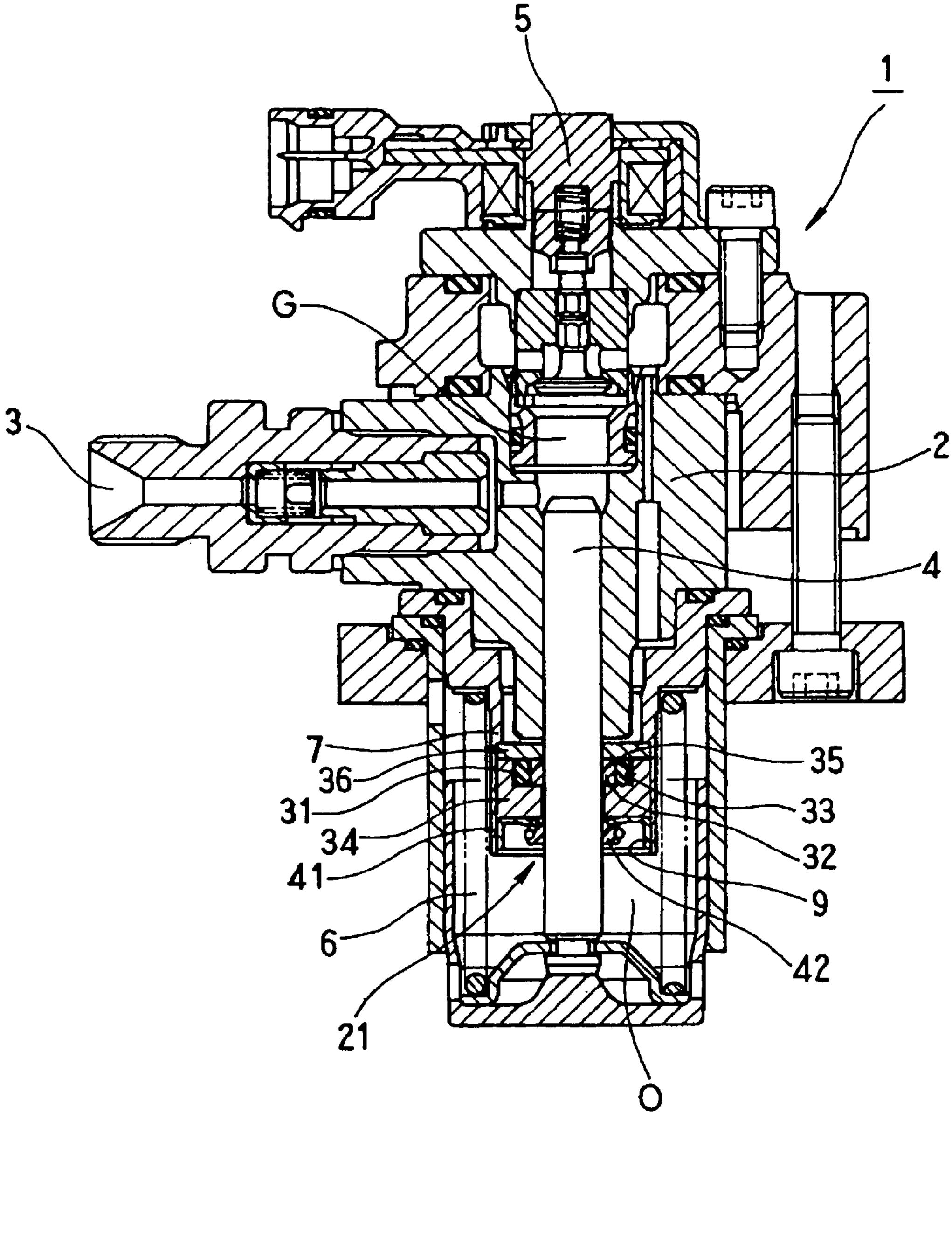
FIG. 6 is a cross sectional view of a high-pressure fuel pump according to a third example of the present invention.

Further, in the first example, the O ring 33 is directly fitted to the inner peripheral side of the seal housing 7. However, as illustrated in FIG. 6, an annular seal holder 34 is fitted to the inner peripheral side of the seal housing 7, and the fuel-side seal 31 which is composed of the seal ring 32 and the O ring 33 is mounted in a seal mounting part 35 in a groove shape provided on the inner peripheral surface of the seal holder 34. Further, in order to prevent slip out of the fuel-side seal 31 which is composed of the seal ring 32 and the O ring 33 from the seal mounting part 35, a washer 36 is provided at the gasoline G side of the fuel-side seal 31, as shown in FIG. 6. Further, as for the washer 36, the fuel pressure pulsation absorbing effect by a space portion between a washer inner diameter and a plunger outer diameter can be achieved, where the fuel pressure pulsation absorbing effect is to absorb pulsation generated in fuel pressure.

Forth Example

Figure 7:
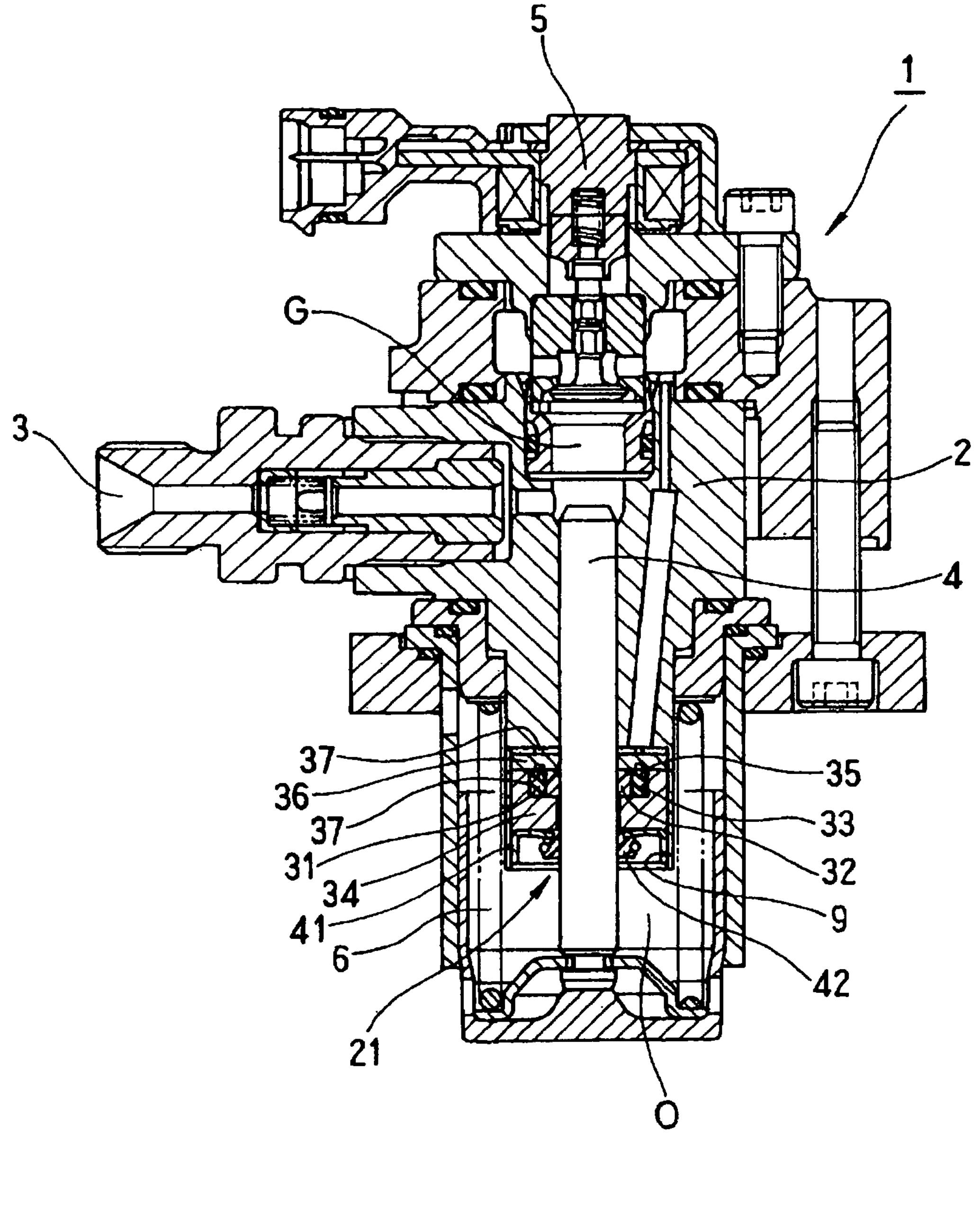
FIG. 7 is a cross sectional view of a high-pressure fuel pump according to a fourth example of the present invention.
Figure 8:
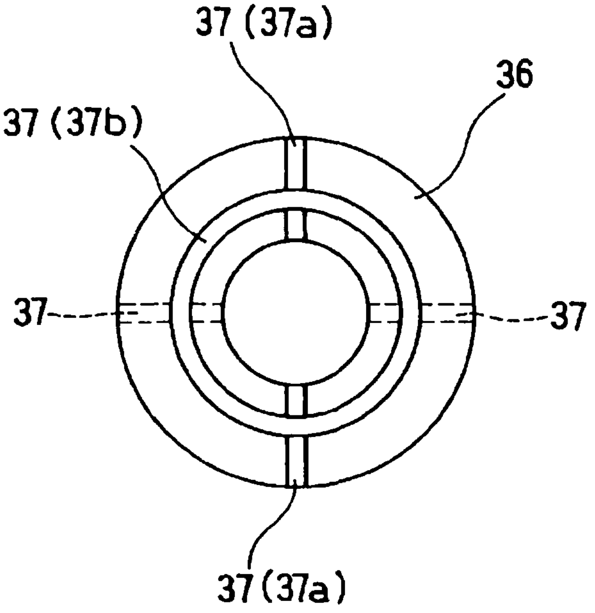
FIG. 8 is a view of a washer as a single product.

In examples of FIG. 7 and FIG. 8, the washer 36 has a diameter directional groove 37*a* and a circular groove 37*b* on one surface thereof so as to form fuel passages. Further, the washer 36 may have diameter directional groove and a circular groove on the other surface thereof. In addition, as illustrated in FIG. 7, the whole of the seal system 21 may be, directly attached to a cylinder 2.

Fifth Example

Figure 9:
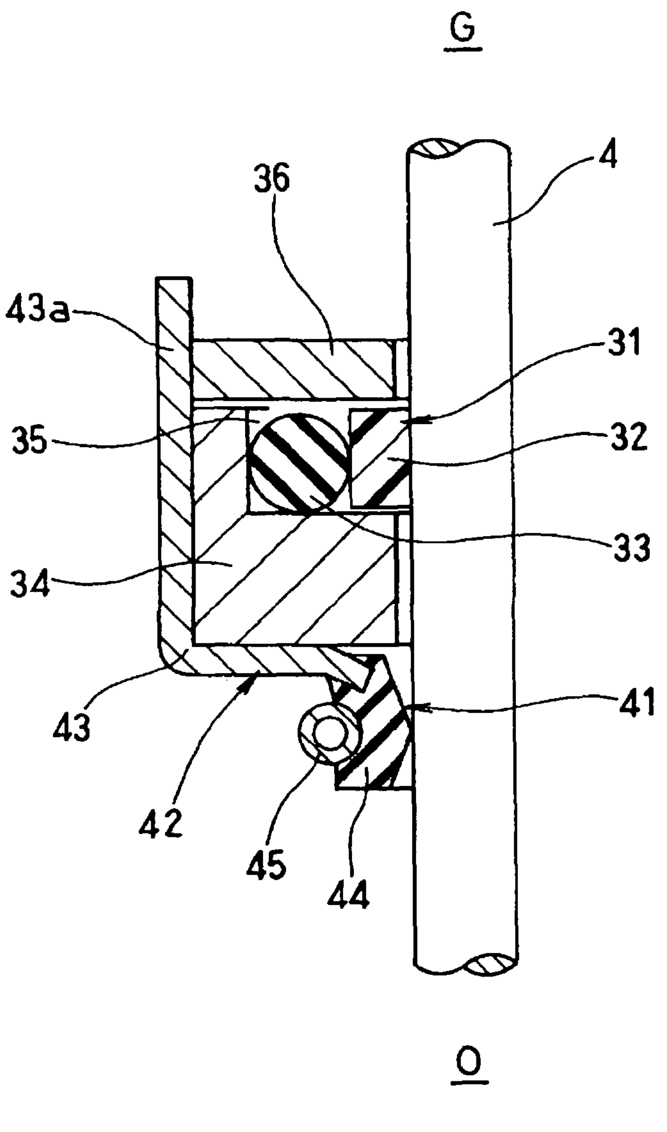
FIG. 9 is a cross sectional view of a main part of a seal system according to a fifth example of the present invention.

Further, as for a structure of the oil seal 42 of the lubricating-oil-side seal 41, the oil seal 42 may have a pipe shaped part 43*a* extending toward the gasoline G side at the metal ring 43 as illustrated in FIG. 9. In this case, constitutional parts such as the seal holder 34, the fuel-side seal 31 and the washer 36 can be attached in the inner peripheral side of the pipe shaped part 43*a*.

Sixth Example

Figure 10:
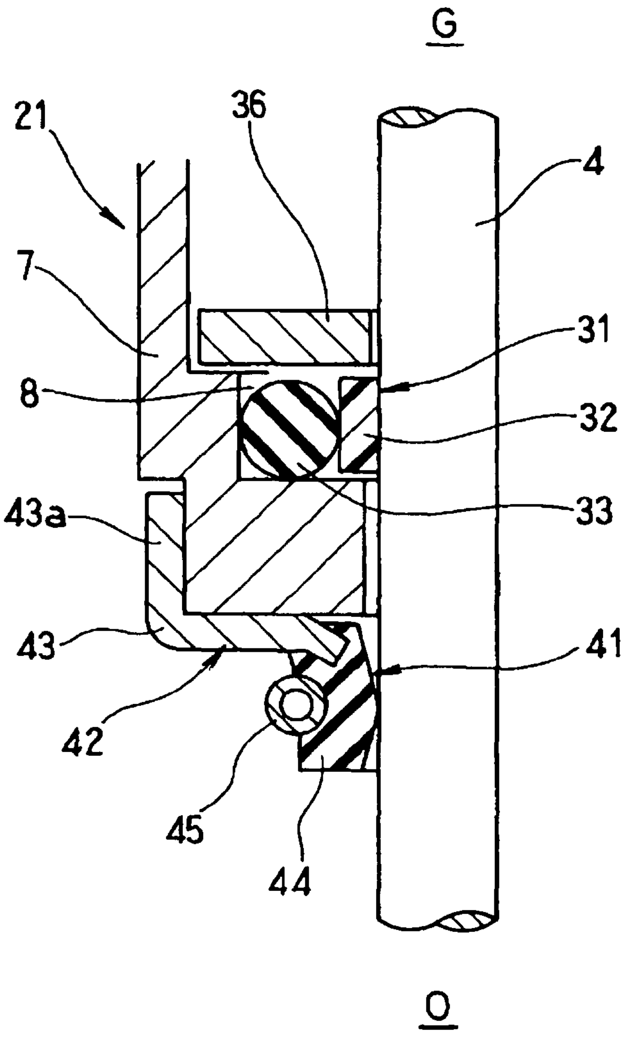
FIG. 10 is a cross sectional view of a main part of a seal system according to a sixth example of the present invention.
Figure 11:
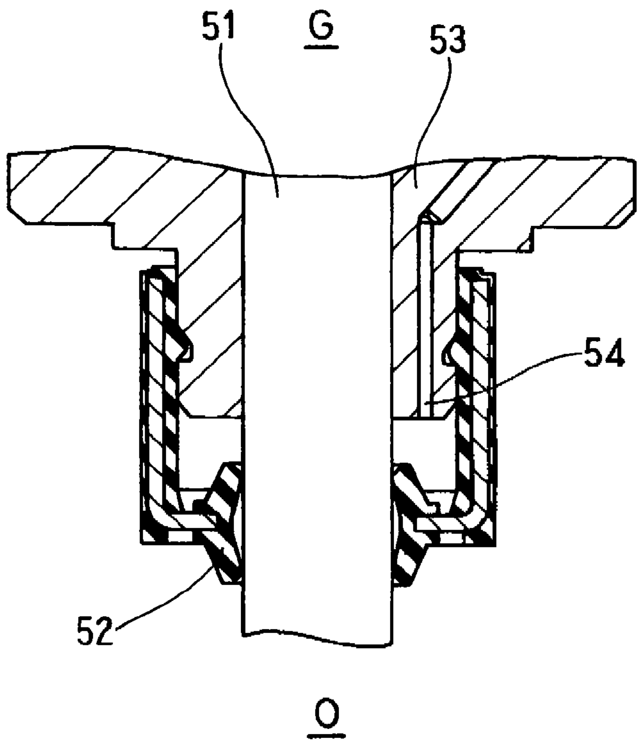
FIG. 11 Prior Art
FIG. 11 is a cross sectional view of a main part of a high-pressure fuel pump according to a conventional example.

Further, as illustrated in FIG. 10, the oil seal 42 may be fitted to an outer peripheral side of the seal housing 7 by use of the pipe shaped part 43*a*.

What is claimed is:

1. A high-pressure fuel pump comprising:

a plunger reciprocating within the pump;

a housing having the plunger passing therethrough; and a seal system for separating/sealing of fuel and lubricating oil as sealing objects, the seal system being located in an annular space between the plunger reciprocating within the pump and the housing having the plunger passing therethrough, wherein the seal system includes:

a recessed seal mounting part provided on an inner periphery of the housing at the fuel side, a fuel-side seal mounted in the seal mounting part at the fuel side for sealing of fuel, a recessed seal mounting part provided on an inner periphery of the housing at the lubricating oil side, and a lubricating-oil-side seal mounted in the seal mounting part at the lubricating oil side for sealing of lubricating oil, wherein the fuel-side seal is composed of a plastic seal ring and an elastomeric O ring for backup of the seal ring, wherein the lubricating-oil-side seal includes a single body of a single-lip-type oil seal, having an elastomeric seal lip fitted to a metal ring and arranged toward the lubricating oil side, and a distance between the fuel-side seal and the lubricating-oil-side seal is larger than a reciprocating motion distance of the plunger, and wherein the elastomeric O ring tightly contacts a tapered inner surface of the housing having a diameter gradually reducing from the lubricating oil side toward the fuel side.

2. The high-pressure fuel pump as claimed in claim 1, wherein a washer is provided at the fuel side of the fuel-side seal.

3. A fuel pump comprising:

a plunger reciprocating within the pump;

a housing having the plunger passing therethrough; and a seal system for separating fuel and lubricating oil, the seal system being located adjacent the plunger reciprocating within the pump and the housing having the plunger passing therethrough, the seal system including:

a first seal mounting part provided on an inner periphery of the housing at a fuel side of the housing, the first seal mounting part being recessed;

a fuel-side seal mounted in the first seal mounting part at the fuel side for sealing fuel;

a second seal mounting part provided at the lubricating oil side of the housing; and a lubricating-oil-side seal mounted to the second seal mounting part at the lubricating oil side for sealing lubricating oil, the fuel-side seal including:

a plastic seal ring; and an elastomeric O ring adjacent the plastic seal ring, the lubricating-oil-side seal being a single body of a single-lip oil seal including:

a metal ring; and an elastomeric seal lip fitted to the metal ring and arranged in a direction to seal lubricating oil, and wherein a distance between the fuel-side seal and the lubricating-oil-side seal is larger than a reciprocating motion distance of the plunger;

wherein the second seal mounting part is provided on an outer periphery of the housing;

wherein a washer is provided at the fuel side of the fuel-side seal; and the washer includes a diameter directional groove on one surface thereof.

4. The fuel pump as claimed in claim 3, wherein the metal ring is mounted to the second seal mounting part.

5. The fuel pump as claimed in claim 3, wherein the metal ring includes a pipe-shaped part mounted to the second seal mounting part.

6. The fuel pump as claimed in claim 3, wherein the lubricating-oil-side seal further includes a garter spring encircling the elastomeric seal lip.

* * * * *